US006252955B1

(12) United States Patent
Antila et al.

(10) Patent No.: US 6,252,955 B1
(45) Date of Patent: Jun. 26, 2001

(54) PROCEDURE FOR SUBSCRIBER ADDRESSING IN A CASCADED V5 INTERFACE

(75) Inventors: Leena Antila; Toivo Lallukka; Olli Liinamaa; Pekka Lehto, all of Oulu; Arto Rukajärvi, Oulunsalo; Jaakko Saarela, Raahe, all of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/497,190

(22) Filed: Feb. 3, 2000

Related U.S. Application Data

(63) Continuation of application No. PCT/FI98/00617, filed on Aug. 7, 1998.

(30) Foreign Application Priority Data

Aug. 12, 1997 (FI) ........................................................ 973312

(51) Int. Cl.[7] ................................................................. H04M 7/00
(52) U.S. Cl. ............................ 379/219; 379/229; 370/522
(58) Field of Search .................................. 379/219, 220, 379/221, 229, 230, 201, 207; 370/314, 351, 352, 429, 439, 522

(56) References Cited

U.S. PATENT DOCUMENTS

| 5,381,405 | * | 1/1995 | Daugherty et al. | 379/252 |
|---|---|---|---|---|
| 5,386,417 | * | 1/1995 | Daugherty et al. | 379/269 |
| 5,754,555 | * | 5/1998 | Hurme et al. | 370/522 |
| 5,781,623 | * | 7/1998 | Khakzar | 379/230 |
| 5,802,177 | * | 9/1998 | Daniel et al. | 455/403 |
| 5,822,420 | * | 10/1998 | Bolon et al. | 379/230 |
| 5,910,980 | * | 6/1999 | Ogasawara et al. | 379/142 |
| 6,047,061 | * | 4/2000 | Cornes et al. | 379/333 |
| 6,069,948 | * | 5/2000 | Yrjana | 379/230 |

FOREIGN PATENT DOCUMENTS

| 195 16 516 | 11/1996 | (DE) . | |
|---|---|---|---|
| 195 24 029 | 11/1996 | (DE) . | |
| 297 04 615 | 6/1997 | (DE) . | |
| 19611001 | 9/1997 | (DE) . | |
| 0 730 389 | 6/1996 | (EP) . | |
| 0 731 618 | 9/1996 | (EP) . | |
| 0 734 186 | 9/1996 | (EP) . | |
| 921035 | 9/1993 | (FI) . | |
| 97/16936 | 5/1997 | (WO) . | |
| 99-17560 | * 4/1999 | (WO) | H04Q/3/00 |
| 99-31896 | * 6/1999 | (WO) | H04Q/3/00 |

OTHER PUBLICATIONS

International Search Report for PCT/FI98/00617.
"V5 Interfaces between Digital Local Exchanges and Access Networks" Khakzar, pp. 44–50.

* cited by examiner

*Primary Examiner*—Ahmad Matar
*Assistant Examiner*—Benny Q. Tieu
(74) *Attorney, Agent, or Firm*—Altera Law Group, LLC

(57) ABSTRACT

Procedure for subscriber addressing in a cascaded V5 interface in a data communication system comprising a telephone exchange (LE) with a number of subscribers defined in it, and access network (AN) connected to the telephone exchange via a first V5 interface (V5) and comprising a first access node (AN1), a second access node (AN2), which is connected to the telephone exchange, and a subscriber terminal (TE), which is connected to the local exchange via the access network and/or the second access node. According to the invention, the second access node (AN2) is connected to the first access node (AN!) via a second V5 interface, the connection between the subscriber and the telephone exchange (LE) being set up by cascading the two V5 interfaces, subscriber parameters comprising an identifier of the first V5 interface (V5) and an identifier of the second V5 interface (V5') and the subscriber's L3 address consistent with the V5 definitions are defined for each subscriber, the signalling between the subscriber and the telephone exchange being effected using the first and second V5 interfaces in accordance with the identifiers.

9 Claims, 3 Drawing Sheets

PROCEDURE FOR SUBSCRIBER ADDRESSING IN A CASCADED V5 INTERFACE

This application is a continuation of international application Ser. No. PCT/FI98/00617, filed Aug. 7, 1998.

BACKGROUND OF THE INVENTION

1. Field of the Invention

The present invention relates to a procedure as defined in the preamble of claim 1 for subscriber addressing in a cascaded V5 interface.

2. Description of the Related Art

V5 interface standards ETS 300 324 and ETS 300 347 describe an interface between a local exchange and an access network and the functionality in each network element. The access network is the part of a local area network that contains the subscriber's lines. Thus, subscribers and subscriber's lines can be connected to the exchange either directly (direct subscribers) or via various multiplexers and/or concentrators. V5 interfaces enable subscribers belonging to a physically separate access network to be connected to a local exchange using a standard interface.

A dynamic concentrator interface (V5.2) as defined in the ETS 300 347 standard series consists of one or more (1–16) PCM (Pulse Code Modulation) lines. One PCM line comprises 32 channels, each of which with a transfer rate of 64 kbit/s, i.e. 2048 kbit/s altogether. The V5.2 interface supports analogue telephones as used in the public telephone network, digital, such as ISDN (Integrated Services Digital Network) basic and system subscriber lines as well as other analogue or digital terminal equipment based on semi-fixed connections.

A static V5.1 multiplexer interface consists of one 2048 kbit/s PCM line. The V5.1 interface supports the same subscriber types as the V5.2 interface except ISDN system lines.

Terminal equipment can be connected to the subscriber ports of the access node. One access node may have one or more V5 interfaces connected to it. Subscriber ports are created in the V5.1 interface by associating an unambiguous address of each subscriber port with a given address in the V5.1 interface. In the local exchange, this address is created as a V5 subscriber. In other words, each subscriber port has an unambiguous address which is coupled with a V5.1 interface address and which uses a certain time slot (analogue subscribers) or certain time slots (ISDN subscribers) for communication with the local exchange. In the V5.2 interface, too, each subscriber port has an unambiguous address, but the signalling to the local exchange is implemented using a dynamically allocated time slot/ dynamically allocated time slots. This means that the BCC (Bearer Channel Control) protocol consistent with the V5 standard allocates the time slots to be used separately for each call.

V5 standardisation aims at creating an open interface for use between a local exchange and an access network. However, no interface for use between the access node and the subscribers within the access network has been defined. Therefore, problems are encountered in connecting subscribers to the access node e.g. via a static concentrator interface. A further problem is that, especially in an environment with multiple suppliers, the solutions of different suppliers for concentrating subscribers in an access network differ significantly from each other, which means that operators do not necessarily have enough choice options regarding suppliers of equipment.

BRIEF SUMMARY OF THE INVENTION

In the telephone network composition and in the V5 interface, unambiguous identification of subscribers or subscriber ports must be possible at least in a limited space. When two V5 interfaces are cascaded, i.e. connected in series, unambiguous identification of subscribers becomes a problem. Especially when a V5.1 interface between a concentrator and an access node is cascaded with a V5.2 interface between the access node and the local exchange, subscriber addressing has to be solved carefully to avoid a situation where subscriber parameters overrun each other or otherwise confuse the signalling between the subscriber and the local exchange.

The object of the present invention is to eliminate the problems described above.

A specific object of the present invention is to disclose a new procedure for subscriber addressing in a cascaded V5 interface. A further object of the invention is to disclose a flexible addressing procedure that can be modified in a way that best suits the operator and the system.

As for the features characteristic of the invention, reference is made to the claims.

The procedure of the invention for connecting a subscriber to a telephone network or to a telephone exchange can be implemented e.g. in a data communication system comprising a telephone exchange and a number of subscribers defined in it. Further, the data communication system comprises an access network connected to the telephone exchange via a first V5 interface and comprising a first access node. The V5 interface is preferably either a V5.1 or a V5.2 interface consistent with the above-mentioned standards. The data communication system also comprises a second access node or a multiplexer, which is connected to the telephone exchange. The second access node is preferably a switching stage through which a number of interconnecting feeders or subscriber lines carrying a relatively light traffic can be connected to a few lines carrying larger amounts of traffic. Using a subscriber terminal connected to the local exchange via the access network and/or directly via the second access node, connections are set up to other subscriber terminals or network elements.

According to the invention, the second access node is connected to the first access node via a second V5 interface, the connection between the subscriber or subscriber terminal and the telephone exchange being thus set up by cascading two V5 interfaces. In a preferred case, the first V5 interface is a standard V5.2 interface and the second V5 interface is a standard V5.1 interface. Further, according to the invention, subscriber parameters' are defined for each subscriber, said parameters comprising the identifiers of the first and second V5 interfaces, v5_interface_id.

Moreover, for each subscriber it is necessary to define an identifier or equivalent data for the time slot or time slots used by the subscriber in the second V5 interface, which is preferably a V5.1 interface, because the subscriber uses a fixed time slot. The subscriber parameters of the subscriber are preferably stored in a subscriber database in the telephone exchange, multiplexer and/or access node.

As compared with prior art, the invention has the advantage that it makes it possible to create access networks using network components manufactured by any manufacturer. In particular, a V5 interface can be used both between a concentrator and an access node and between an access node and a local exchange.

Moreover, the invention allows a multiplexer to be easily connected to a local exchange using a V5 interface either via an access node supporting the V5 interface or directly via a V5.1 interface.

The invention also has the advantage that the subscriber parameters or identifier data of subscribers can be flexibly determined in the whole access network, and the identifier data can be easily changed because the subscriber parameters are not subject to network component-specific limitations. On the other hand, subscriber parameters can be more closely limited to certain network components and parameter conversions can be performed as necessary, thus allowing simpler and faster transmission of messages between network components. In addition, management of subscriber parameters becomes simpler. The invention also makes it possible for the system to determine certain parameters, permitting simpler description of the network.

As stated above, depending on the embodiment of the present invention and the use for which the network has been designed, subscribers can be managed in regard of subscriber parameters in many ways in the access network. In a preferred embodiment, the first and second V5 interfaces are treated separately. This means that subscribers have subscriber parameters differing from each other both in the first and in the second V5 interface. In this case, in connection with call signalling, the subscriber parameters are converted in the first access node to match each other and to adapt them to the V5 definitions.

In another embodiment, identifiers of the first and second V5 interfaces differing from each other as well as the same L3 address in both the first and the second V5 interfaces are defined for each subscriber. In this case, it will only be necessary to convert the identifiers of the first and second V5 interfaces into a mutually corresponding form. It is also possible to define for the first and second V5 interfaces identifiers differing from each other, in which case they, too, will be converted into a mutually corresponding form.

Further, the subscriber parameters preferably comprise an identifier of the capacity reserved for the subscriber in the second V5 interface as well as a subscriber type identifier, which in practice means one time slot or b-channel allocated for an analogue subscriber and two time slots or b-channels allocated for a digital subscriber, such as an ISDN subscriber.

BRIEF DESCRIPTION OF THE SEVERAL VIEWS OF THE DRAWING

In the following, the invention will be described in detail by the aid of a few examples of its embodiments by referring to the attached drawing, in which.

DETAILED DESCRIPTION OF THE INVENTION

Figure 1:
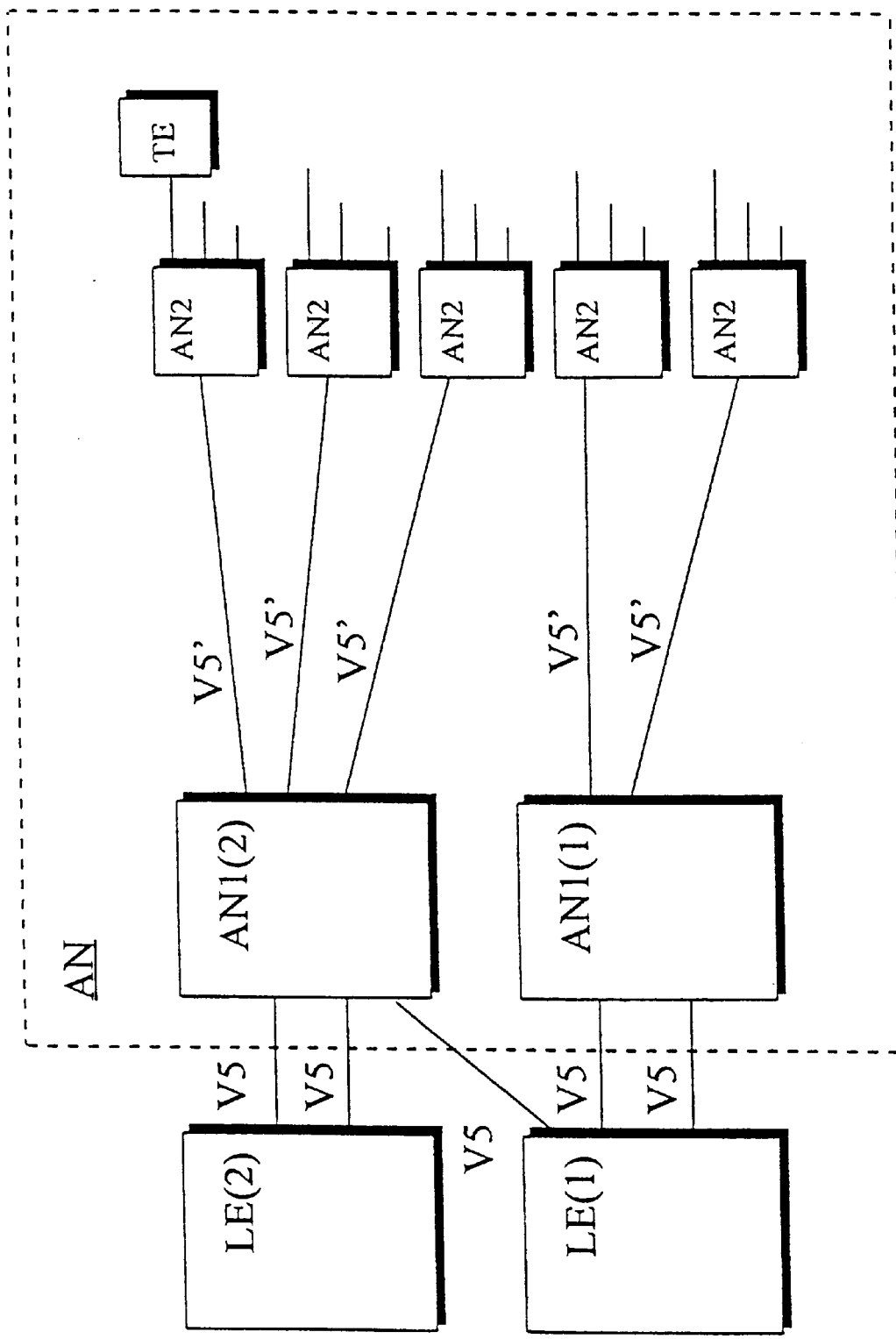
FIG. 1 presents a data communication system preferable for the procedure of the invention.

The data communication system presented in FIG. 1 comprises two local exchanges LE(1), LE(2) and access nodes AN1(l), AN1(2) respectively connected to the local exchanges. In this example, the access nodes are connected to the local exchanges via V5.2 interfaces V5. As shown in the figure, one access node ANIL can be connected to several local exchanges, thus allowing a subscriber to be handed over to another local exchange using operation control commands. Moreover, the system comprises a number of second access nodes or multiplexers AN2, which are connected to a local exchange LE via access nodes AN1. The multiplexer AN2 is connected to the first access node AN1 via a second V5 interface, which is a V5.1 interface V5'. Further, in the example in FIG. 1, the subscriber terminal TE is connected to a local exchange via a multiplexer AN2 and an access node AN1. The access network AN consists of the subscriber terminal equipment TE, the second access node AN2, the first access node AN1 and the lines connecting them.

The V5 interfaces presented in the data communication system depicted in FIG. 1 are activated independently of each other. The interfaces are preferably activated in accordance with the normal V5 definitions. Let it be further stated that, in the system illustrated by FIG. 1, it is possible to implement a so-called management network, which is connected to the local exchange LE, to the first access node AN1 and to the multiplexer AN2. However, the structure and function of the management network will not be described here in detail, but reference is made to the V5 standards.

Figure 2A:
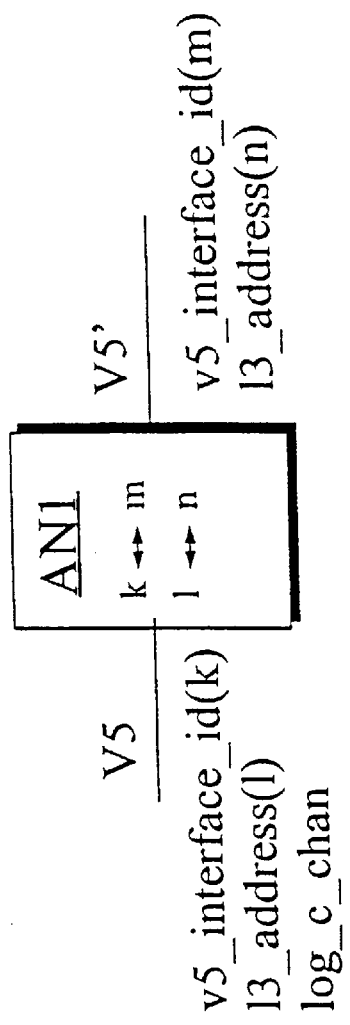
FIGS. 2a–2c are diagrams illustrating subscriber addressing in an access node.

FIG. 2a presents an example of a situation where separate subscriber parameters have been defined for the subscriber. In this case, the subscriber identifier data in the message transmitting first access node AN1 are: V5 interface identifier in the first V5 interface V5, V5 interface identifier in the second V5 interface V5', L3 address in the first V5 interface V5, L3 address in the second V5 interface V5', analogue subscriber's time slot in the second V5 interface and ISDN subscriber's signalling channel in the first V5 interface and time slots in the second V5 interface. In the V5.2 interface, the subscriber's V5 interface identifier is v5_interface_id (k), the subscriber's L3 address is l3_address(1) and the time slot used by the subscriber is log_C_chan.

In the solution illustrated by FIG. 2a, parameters k and l of the first V5 interface V5 are converted to match parameters m and n of the second V5 interface V5', respectively. As for the advantages of the solution presented in FIG. 2a, it can be stated that it is the most logical solution in respect of the standards because in any case there will be more than one V5.2 and V5.1 interface connected to the access node. In addition, the solution is a flexible one because the subscriber can be easily handed over from one V5.2 interface to another V5.2 interface and, correspondingly, from one V5.1 interface to another V5.1 interface.

Figure 2B:
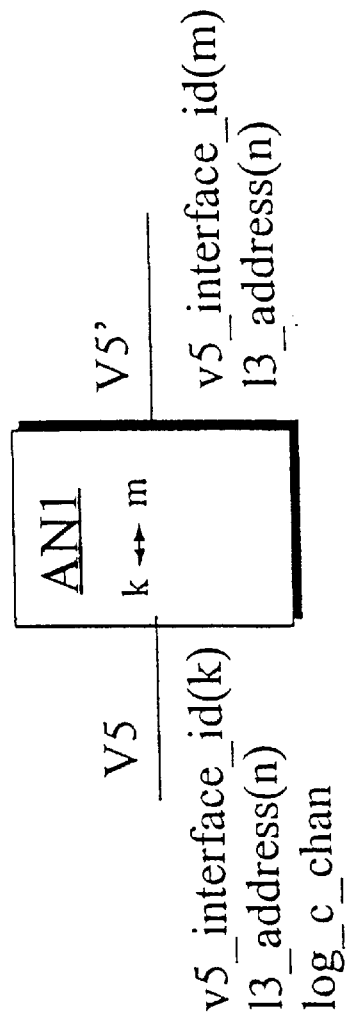

FIG. 2b illustrates situation where the subscriber has been assigned the same L3 address in both the first and the second V5 interfaces V5, V5'. In this case, the subscriber identifier data in the message transmitting first access node AN1 are: V5 interface identifier in the first V5 interface V5, V5 interface identifier in the second V5 interface V5', common L3 address in the first and second V5 interfaces, analogue subscriber's time slot (b-channel) in the second V5 interface and ISDN subscriber's signalling channel in the first V5 interface and time slots in the second V5 interface. In this situation, the L3 address, l3_address, is stored only once in the subscriber database and the address is used in both V5 interfaces. Such an alternative is very practical if unique L3 addresses are used for all subscribers. Moreover, the amount of conversions to be performed in the first access node AN1 is reduced because only parameter k of the first V5.2 interface V5 needs to be converted to match parameter m of the second V5.1 interface V5'.

Figure 2C:
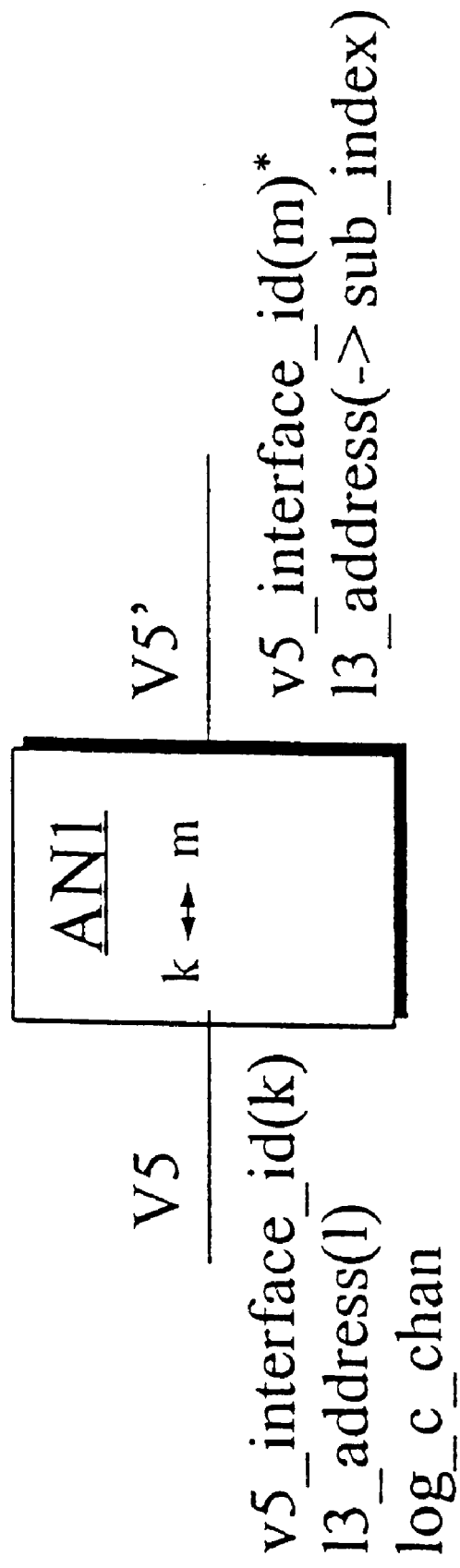

FIG. 2c presents an example of a situation where separate subscriber parameters have been defined for a subscriber so that the identifier data for the first V5 interface V5 are determined in connection with the creation of the subscriber and the identifier data for the second V5 interface are generated by the access node itself. In this case, the subscriber identifier data in the message transmitting first access node AN1 are: V5 interface identifier in the first V5 interface V5', V5 interface identifier in the second V5 interface V5', L3 address in the first V5 interface V5, analogue subscriber's time slot in the second V5 interface and ISDN subscriber's signalling channel in the first V5 interface and time slots in the second V5 interface. In addition, in the message transmitting access node an internal subscriber data index is defined for the subscriber, based on which the subscriber's L3 address is defined in the second V5 interface V5' and possibly the identifier of the second V5 interface as well. In the second V5 interface V5', subscribers are addressed by using indexes, sub_index, internal to the access network. The sub_index number points to a certain b-channel or certain b-channels in the V5.1 interface, because one b-channel is allocated for analogue subscribers and two successive b-channels for ISDN subscribers. By using unique sub_index pointers, these can serve as a basis on which the identifier of the second V5 interface V5' used by the subscriber is determined.

In summary, regarding the control of subscriber parameters and V5 interface identifiers, let it be further stated that, in conjunction with call signalling, it will be necessary to read the subscriber database independently of the subscriber management method used. Therefore, the subscriber management method can be determined separately for each case in the most advantageous manner.

The invention is not restricted to the examples of its embodiments described above, but many variations are possible within the scope of the inventive idea defined by the claims.

What is claimed is:

1. A method for subscriber addressing in a cascaded V5 interface in a data communication system comprising a telephone exchange (LE) with a number of subscribers defined in it, an access network (AN) connected to the telephone exchange via a first V5 interface (V5) and comprising a first access node (AN1), a second access node (AN2), which is connected to the telephone exchange, and a subscriber terminal (TE), which is connected to the telephone exchange via the access network and/or the second access node, wherein the second access node (AN2) is connected to the first access node (AN1) via a second V5 interface, the connection between the subscriber terminal (TE) and the telephone exchange (LE) being set up by cascading the two V5 interfaces, wherein subscriber parameters are defined for each subscriber, the parameters comprising an identifier of the first V5 interface (V5) and an identifier of the second V5 interface (V5') and the subscribers L3 address consistent with the V5 definitions, the signalling between the subscriber terminal (TE) and the telephone exchange being effected using the first and second V5 interfaces in accordance with the identifiers.

2. The method as defined in claim 1 wherein the subscriber parameters of the subscriber are stored in a subscriber database in the telephone exchange (LE), in the second access node (AN2) and/or in the first access node (AN1).

3. The method as defined in claim 1, wherein the identifier of the second V5 interface (V5') is determined in an internal identifier range in the access network (AN) and converted in conjunction with call signalling to adapt it to the V5 definitions.

4. The method as defined in claim 1, wherein an index internal to the subscriber data is defined for the subscriber in the access network, the internal index is stored in the subscriber database and the subscriber's subscriber parameters concerning the second V5 interface (V5') are determined on the basis of the internal index.

5. The method as defined in claim 1, wherein the subscriber parameters are so defined that the identifiers and L3 address of the first and second V5 interfaces (V5, V5') determined for the subscriber differ from each other both in the first and in the second V5 interface (V5, V5') and the subscriber parameters of the first and second V5 interfaces are converted in the first access node (AN1) to match each other.

6. The method as defined in claim 1, wherein the subscriber parameters are so defined that the identifiers of the first and second V5 interfaces (V5, V5') determined for the subscriber differ from each other while the L3 address is the same both in the first and in the second V5 interface (V5, V5') and the subscriber parameters of the first and second V5 interfaces are converted in the first access node (AN1) to match each other.

7. The method as defined claims 1, wherein the subscriber parameters further comprise an identifier of the capacity allocated for the subscriber in the second V5 interface (V5') as well as an identifier of subscriber type.

8. The method as defined in 1, wherein the subscriber parameters further comprise an identifier of the signalling channel allocated for a digital subscriber in the first V5 interface (V5).

9. The method as defined in claim 1, wherein the interface between the access network (AN) and the telephone exchange (LE) is a V5.2 interface and the V5 interface between the second access node (AN2) and the first access node (AN1) is a V5.1 interface.

* * * * *